Feb. 24, 1942.   K. R. HERMAN ET AL   2,274,603
HYDRAULIC FEED CONTROL PANEL
Filed July 26, 1937   5 Sheets-Sheet 2

INVENTORS
Kenneth R. Herman
Ferris T. Harrington
BY  L. Raymond Twyman
Barnes, Kisselle, Laughlin & Raisch
ATTORNEYS Feb. 24, 1942.   K. R. HERMAN ET AL   2,274,603
HYDRAULIC FEED CONTROL PANEL
Filed July 26, 1937   5 Sheets-Sheet 3

INVENTORS
Kenneth R. Herman
Ferris T. Harrington
L. Raymond Twyman
BY
Barnes, Kisselle, Laughlin & Raisch
ATTORNEYS Feb. 24, 1942.    K. R. HERMAN ET AL    2,274,603
HYDRAULIC FEED CONTROL PANEL
Filed July 26, 1937    5 Sheets-Sheet 4

INVENTORS
Kenneth R. Herman
Ferris T. Harrington
L. Raymond Twyman
BY Barnes, Kisselle, Laughlin & Raisch
ATTORNEYS

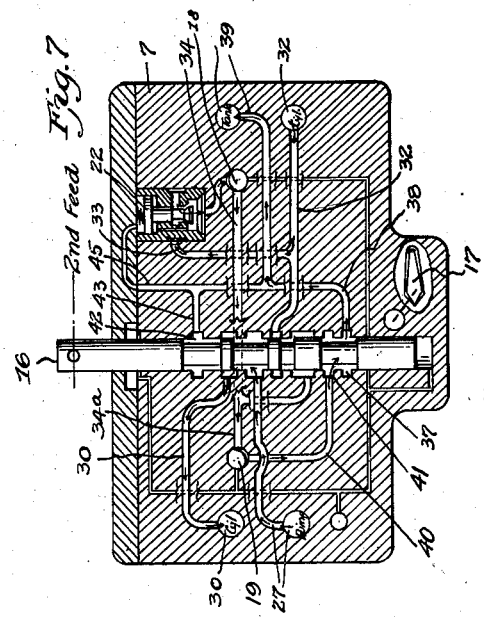
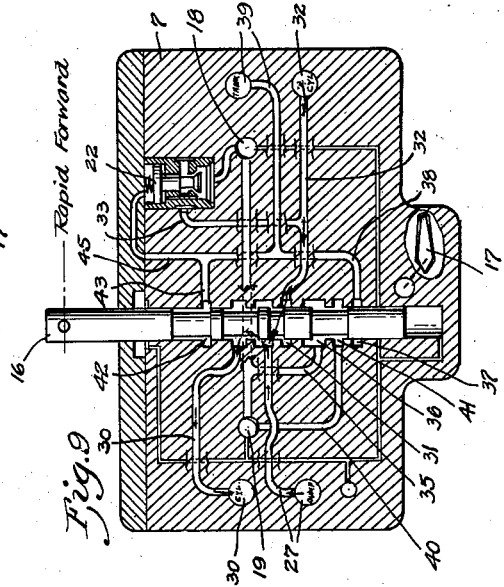
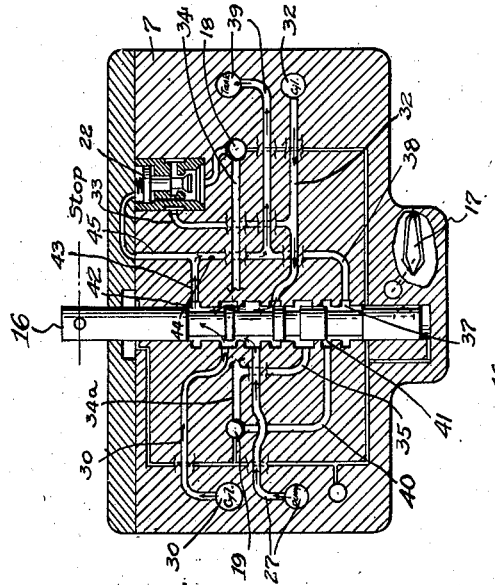
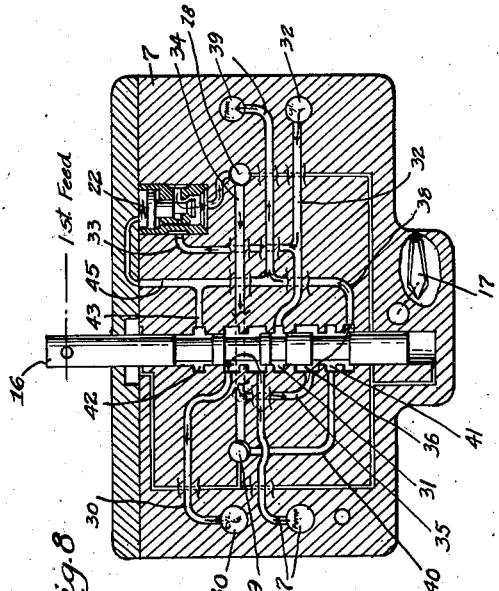

Patented Feb. 24, 1942

2,274,603

UNITED STATES PATENT OFFICE 2,274,603

HYDRAULIC FEED CONTROL PANEL

Kenneth R. Herman, Ferris T. Harrington, and L. Raymond Twyman, Detroit, Mich., assignors to Vickers, Incorporated, Detroit, Mich., a corporation of Michigan Application July 26, 1937, Serial No. 155,652

12 Claims. (Cl. 60—52)

This invention relates to improvements in a hydraulic feed control panel to be used for regulating the speed and direction of the reciprocating part of a machine tool, actuated by a double acting piston and cylinder.

An object of the present invention is to furnish a control unit applicable to drilling, reaming, boring, turning, milling and equivalent machine tool cycles which is adaptable to a wide variety of cycle requirements it being capable of providing any cycle sequence as made up of rapid advance, adjustable coarse feed, adjustable fine feed, jump feed and rapid return motions.

Another object of the invention is to provide a control unit which allows smooth and accurate feed rates regardless of cutting tool resistance or changes in hydraulic operation pressure. This is accomplished by the arrangement of the circuits which places the throttle valves in series with the exhaust flow of a double acting cylinder. An advantage of this control unit is that it may be used with a number of different types of pumps, the choice depending on the type available and the requirements of the particular machine cycle to be controlled. Both constant delivery and variable delivery pumps may be used, but, regardless of which type is used, a smooth feed rate is maintained which is unaffected by changes in pump slippage.

Another advantage of the present control panel over previous control devices, is that, in the shifting of the valve from one position to another to effect changes in the speed of the cycle, there is no possibility of a "blind spot" between the stages of the cycle, since the coarse and fine feeds are in series and the speed control is accomplished by directing exhaust flow through throttle valves.

Since a hydrostatic valve or pressure governor is arranged in series with coarse and fine feed throttle valves, exhaust oil from the cylinder motor passes through the throttle valves to a tank return line in the sequence named when a feed selector valve is in a position so that fine feed is in progress. The coarse feed throttle valve is not effective at this time due to the fact that the opening through the same is of greater area than that of the fine feed throttle. Movement of the feed selector valve connects the oil exhausting from the coarse feed throttle directly to the tank return line, making the fine feed ineffective without interruption of the flow from the cylinder motor through the hydrostatic valve and the coarse feed throttle. The change from coarse to fine feed is accomplished by diverting the flow through the coarse feed throttle from the tank return to the fine feed throttle and then to the tank, placing the two in series and causing the fine feed throttle to be effective.

A further feature of the invention allows a rapid traverse of the machine tool with a pump of half the ordinary volume by using a differential cylinder traverse action in which pressure liquid is furnished to both sides of the piston and traverse rates are proportional to piston area less piston rod area. The invention is also adapted to be used with an automatic reversing arrangement with a time delay or remote control starting system, if desired.

An important feature is the simplicity of design of the panel which eliminates a plurality of valves leaving only two moving parts with no elaborate linkage or latch devices. Other advantages will be apparent in the course of the description.

In the drawings:

Figs. 6, 7, 8 and 9 are cross-sections of the panel as shown in Fig. 1 with the valve in stop, second feed, first feed, and rapid forward positions, respectively.

Figure 2:
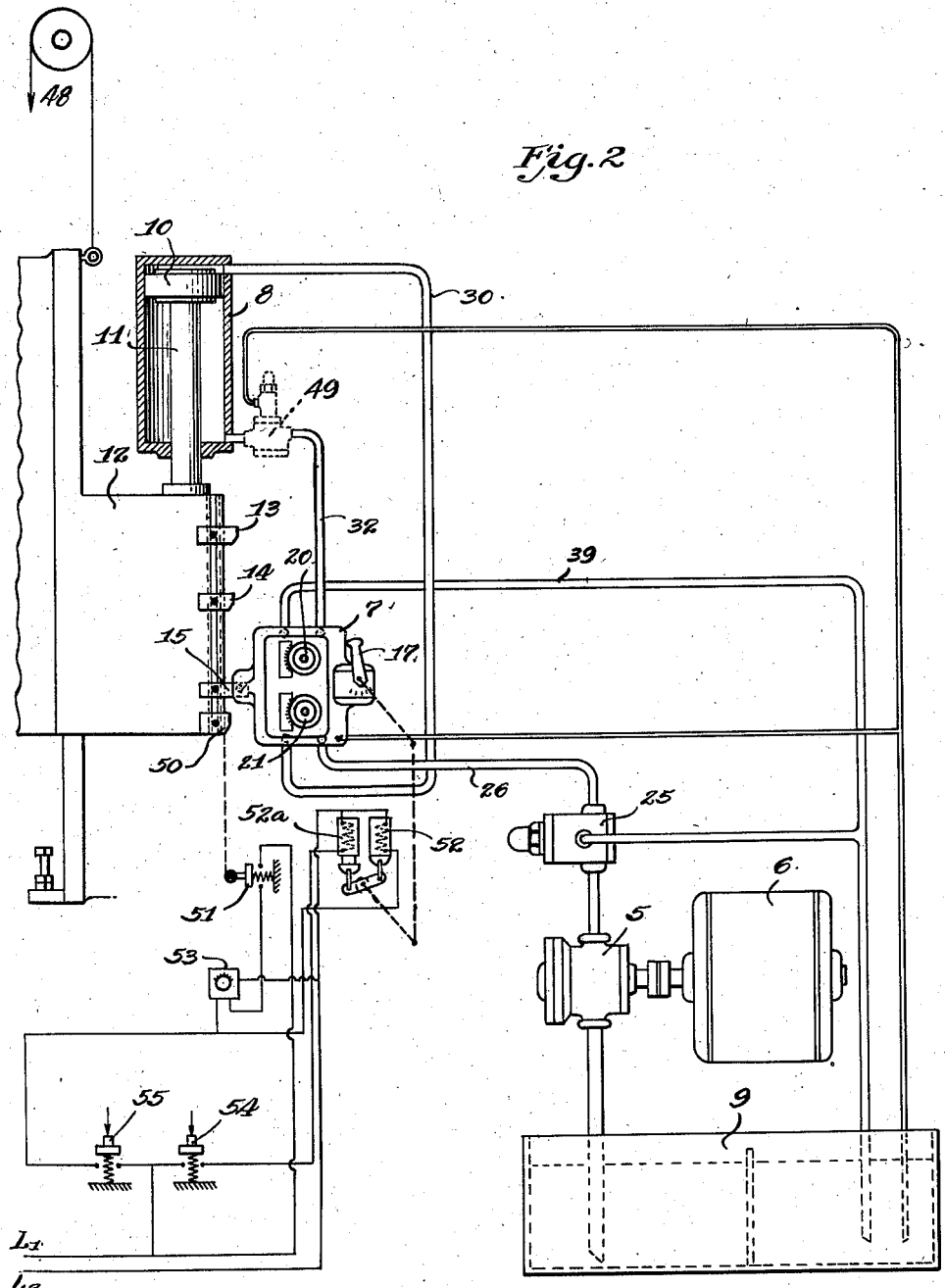
Fig. 2 illustrates the use of the control panel in a hydraulic machine system using a constant delivery pump.

Referring to Fig. 2, a constant delivery pump 5 driven by a motor 6 is arranged to furnish liquid under pressure to a control panel 7 which is operably connected by liquid pressure lines to a conventional differential or compound cylinder 8. The liquid, which is supplied by a tank 9, is preferably oil and will hereafter be referred to as oil. Contained in cylinder 8 is a slidable piston 10 having a piston rod 11 directly connected to a reciprocating work table 12 of a machine tool. Cams 13, 14 and 15 are mounted on the working table 12, in such relation to the control panel 7 as to contact and actuate the stem of a control or selector valve 16 at various stages in the cycle of the machine tool.

Figure 1:
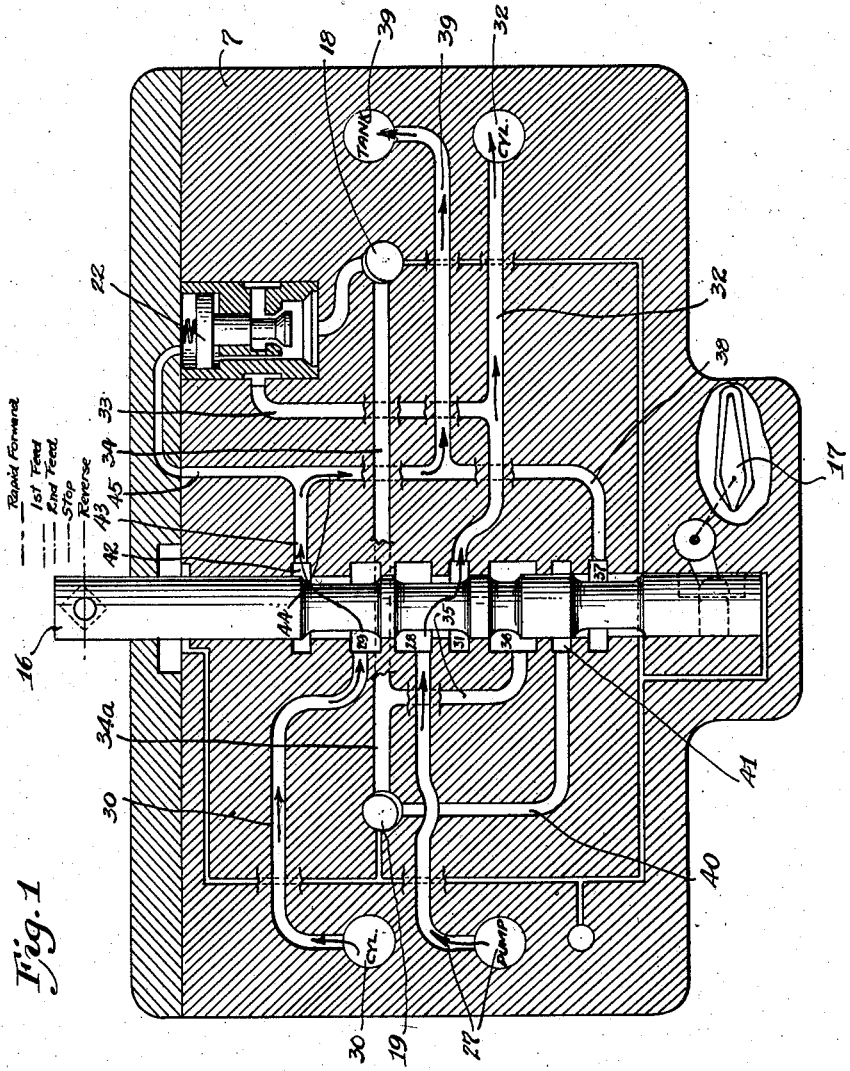
Fig. 1 is a cross-section of the control panel showing all the passageways in the same plane for purposes of illustration. This panel affords differential action in rapid traverse forward.

The selector valve stem 16 is assembled in the housing of the control panel 7, as shown in Fig. 1, and is adapted to be shifted axially in the panel to effect rapid advance, first and second feeds, reversal, and stopping of the cycle. A lever 17, located on the panel 7, is operatively connected to the valve stem 16 to permit the operator manually to shift the valve to any position. Two adjustable throttle valves 18 and 19, located in the panel housing 7, are operated from the face of the panel by any standard locking type dials 20 and 21 shown in Fig. 2. A flow control or hydrostatic valve 22, also positioned in the control panel housing and circuit, is of the type disclosed in British Patent No. 399,609, of June 12, 1931.

The control panel can best be described by setting forth its operation in the hydraulic system of Fig. 2.

In the operation: Oil under pressure is furnished by the pump 5 through a relief valve 25, and a conduit 26 to a pressure inlet line 27 in the housing 7. With the valve stem 16 shifted to rapid forward position in its extreme uppermost position shown in Fig. 9, oil under pressure passes through line 27, ports 28 and 29, and a line 30 to the piston end of the cylinder 8; and oil is also furnished under pressure to the rod end of the cylinder 8 through line 27, ports 28 and 31 and a line 32. The piston 10 is then subjected to equal unit pressures on both sides and will have an advance at a rate proportional to the difference in working areas of the respective sides of said piston. During this period of the cycle there is a differential between the piston area and the rod area for a faster speed of the piston. This is a rapid traverse portion of the cycle and it continues until cam 14 depresses the valve stem 16 and pushes the selector valve downward to a "first speed" position shown in Fig. 8. Pressure is then directed to the piston end of the cylinder as before through line 27, ports 28 and 29 and line 30, but the rod end of the cylinder is now closed to the pressure source and is open to the tank 9 through the line 32, a passageway 33, the flow control valve 22, throttle valve 18, lines 34 and 35, ports 36, 41 and 37, and lines 38 and 39. The effect of the throttle valve 18 being in series with the exhaust flow from the rod and of the cylinder 8 will be a restriction in the exhaust flow and a consequent reduction in the feed rate of the working table. This stage of the cycle is called the "coarse feed" stage.

This coarse feed continues until the cam 13 depresses the valve stem 16 to a "second feed" position shown in Fig. 7. With the valve 16 in this position, pressure is furnished to the piston end of the cylinder 8 as in the "first feed" stage. The course of the exhaust flow, however, from the rod end of the cylinder changes so that it travels in series through both throttle valves 18 and 19. The throttle 18 does not restrict or control the flow during the "second feed" stage. More specifically, the flow from the rod end of the cylinder is through lines 32 and 33, flow control valve 22, throttle valve 18, lines 34 and 34a throttle valve 19, a passageway 40, a port 41, port 37 and thence through lines 38 and 39 to the tank. The throttle valve 19 is designed to provide a finer adjustment than that of valve 18. The coarse throttle 18 takes the flow through itself but does not restrict or control flow when in fine feed.

When the table reaches the end of its stroke, the operator shifts the handle 17 and the valve 16 downward to reverse position as shown in Fig. 1. The rod end of the cylinder is then open to the pressure source through line 27, ports 28 and 31, and line 32,—thus causing the piston 10 to be moved upwardly at a rapid rate to starting position. During this reverse traverse, the piston end of the cylinder is connected to the tank line 39 through line 30, port 29, a port 42 and passageways 43 and 44.

As the table reaches its starting position, the cam 15 pulls the valve stem 16 into "stop" position shown in Fig. 6. The pressure line 27 and both ends of the cylinder 8 are then open to the tank so as to unload the pump until the valve stem is again shifted to restart the cycle.

The exhaust flow of the rod end of the cylinder is always open to the upper side of the flow control valve 22 through the passageway 44 and a passageway 45. This flow control valve serves to maintain a constant pressure differential across the throttle valve or valves 18 and 19 as described in the previously mentioned British patent.

The circuit just described with the constant displacement pump is the preferred circuit for the control panel, since, with the differential action in the rapid traverse stroke, less volume of pressure liquid is needed, and consequently a smaller pump may be used.

Figure 3:
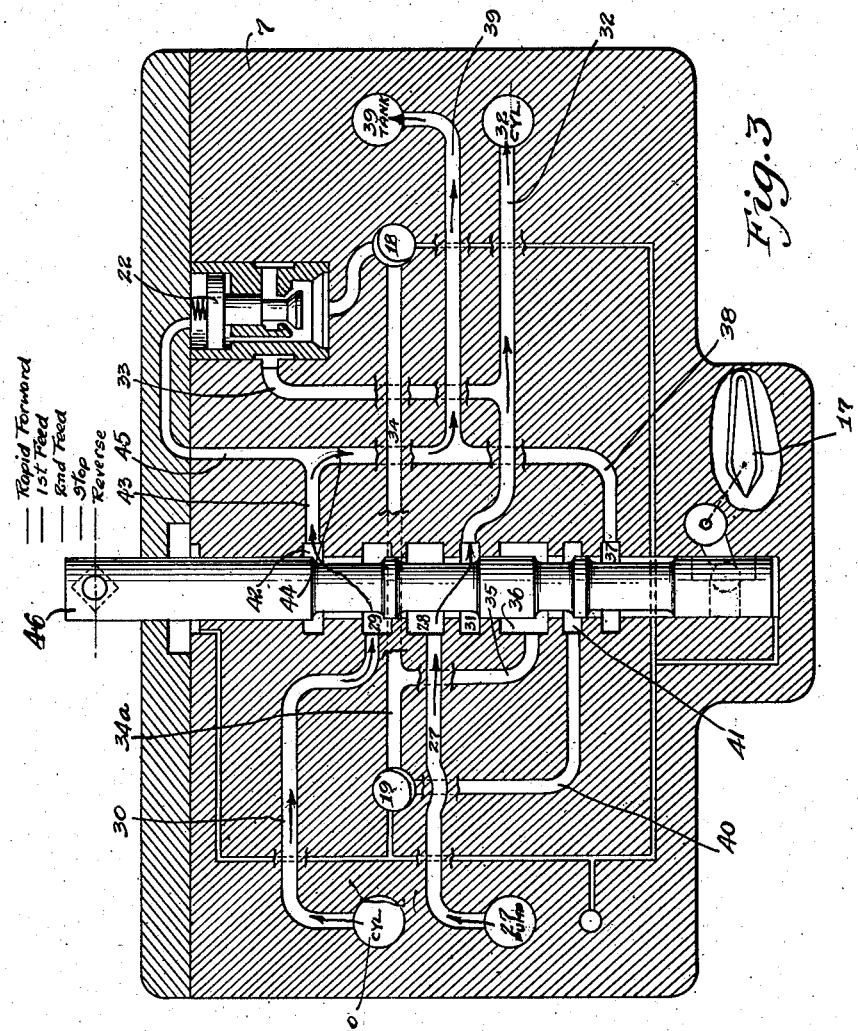
Fig. 3 is a cross-section of a control panel with a different valve spool to provide non-differential rapid advance.

A modification of the control panel is shown in Fig. 3. The housing and the various elements therein are exactly the same as that shown and described with Fig. 1, and the panel may be used in a circuit shown in Fig. 2. The valve stem, however, designated 46 is formed with different spools than the valve stem 16 of Fig. 1 and will produce a slightly different circuit.

Figure 4:
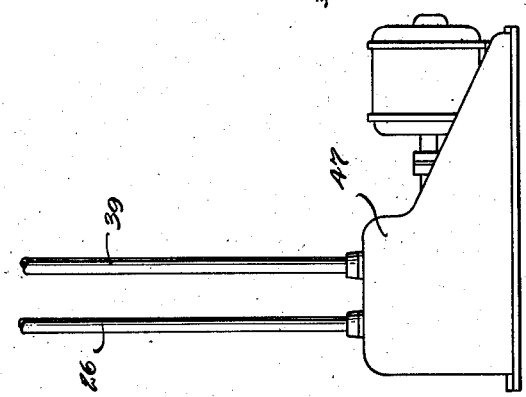
Fig. 4 illustrates the variable delivery pump which is preferably installed in the system of Fig. 2 in lieu of the fixed displacement pump.

When the handle 17 is in "rapid forward" position, pressure passes through the line 27, ports 28 and 29, and line 30 to the piston end of the cylinder 8 just as in the previous modification. The rod end of the piston, however, instead of being connected to the pressure source, as in the previously described panel, is connected to the tank through line 32, ports 31, 36, 41 and 37, and lines 38 and 39. Fig. 4 shows a housing 47 of a variable delivery pump and the conduits 26 and 39 of the system in Fig. 2 would enter the pump housing 47 as indicated. A variable delivery piston pump such as that shown in Fig. 5, to be described later, would be used in the housing 47.

It will be understood that either control panel may be used with a constant delivery pump and relief valve or a variable delivery piston pump with pressure stroke control, and that the operating valve 16 or 46 unloads the pump entirely when the cycle is completed. This minimizes the power input to the system during normal operation. The differential traverse action panel, however, represented by Fig. 1, allows the use of a pump having a smaller maximum volume. For instance, by using a rod having approximately half the area of the cylinder, a rapid traverse can be obtained by using a pump having half the volume necessary when a conventional traverse action is used. The reason for this is that in a conventional traverse action, the full piston area is effective for the initial rapid traverse while in the return traverse, the effective area equals the area of the piston minus the area of the rod. Whereas, in the differential traverse action panel the effective area in both rapid forward and rapid reverse movements is one-half the piston area.

By a comparison of the panel illustrated in Figure 1 with that illustrated in Figure 3 it will be seen that the only difference is in the spacing and length of the various lands and grooves on the valve spools 16 and 46, respectively. Thus the same body and coring for the entire panel may be used with a spool such as 16 in Figure 1 to provide the differential rapid traverse action or may be used with a spool such as 46 in Figure 3 to provide the non-differential rapid traverse action. This feature entails considerable economy in production cost where panels of both types are required for various installations. Furthermore, it expedites changeovers in a given machine from differential rapid traverse action to non-differential rapid traverse action by merely substituting a different spool.

It will be seen that with the speed control throttles both in series with the exhaust from the cylinders during the feed strokes, there is eliminated the possibility of changes in feed rate due to changes in pump slippage. This arrangement also prevents tools from jumping ahead when breaking through the work and thus results in longer tool life.

When the vertical arrangement is used, as shown in Fig. 2, a counterbalance may be used as at 48, or, as an alternative, a by-pass and check valve 49 located in the conduit 32 leading from the rod end of the cylinder. This valve 49 places a hydraulic restriction in the line 32 leading from the lower end of the cylinder to the panel sufficient to balance the weight of the slide, effective only when flow is in the downward direction, and the check valve in the unit 44 permits free or unrestricted flow from the panel to the cylinder to raise or return the slide. If a horizontal rather than a vertical installation were desired, these counterbalance devices could be dispensed with.

If desired, the system may be provided, in the following manner, with an automatic reverse: A cam 50 may be arranged to contact a reversing switch 51 at the end of the first half of the cycle. This switch is located in an electrical circuit originating at $L_1$, $L_2$ and containing solenoids 52 and 52a which are operatively connected to the handle 17, as diagrammatically illustrated in Fig. 2. When the reversing cam 50 closes switch 51, the solenoid 52 will actuate the lever 17 and thereby shift the valve stem 16 to reversal position.

Where a delayed reverse is necessary, an electric time delay device 53 may be incorporated in the electric circuit of Fig. 2. The electric control also allows the insertion of a remote control starting switch 54 for actuating solenoid 52a, and an emergency reverse switch 55. This will permit remote control of the machine at a point out of reach of the lever 17.

Figure 5:
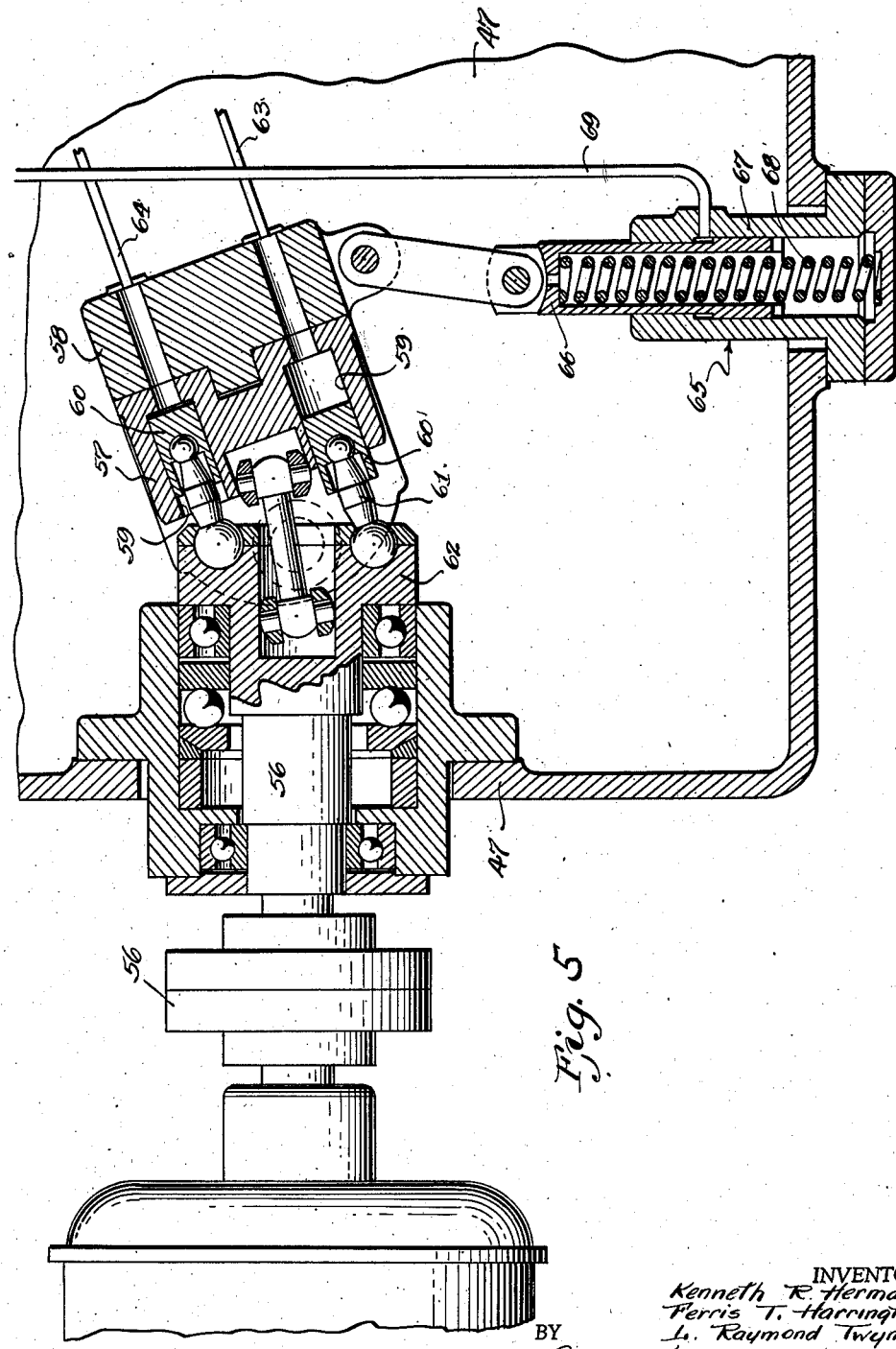
Fig. 5 shows a cross-section of the variable delivery pump.

The variable delivery pump previously referred to in connection with the control panel is shown in detail in Fig. 5. The drive shaft 56 is rotated from any convenient source of power and is mounted in an anti-friction bearing supported by a side wall of the tank 47. A multiple plunger rotary pump is actuated by the shaft 56 and comprises a cylinder block 57 universally connected to the end of the shaft 56 and rotatable upon a port member 58. The block 57 has a plurality of cylinders 59 in which pistons 60 are slidably mounted. These pistons 60 are actuated by links 61 having spherical heads mounted in bearings in a rotatable member 62 which is fastened directly to the drive shaft 56. The cylinder block 57 and port member 58 are adapted to be held so that their center axis forms an angle with the axis of the shaft 56. Consequently, upon rotation of the drive shaft, the pistons 60 will be pushed into and withdrawn from the cylinders 59 as the cylinders and pistons rotate in unison about the axis of the cylinder block 57. The intake of the pump is shown by a conduit 63 and the outlet by conduit 64. The angle which the cylinder block forms with the driving shaft is controlled by a pressure stroke compensator 65 which consists of a movable piston 66 pivotally connected to the port member 58 and the stationary cylinder 67 which is mounted in the side wall of the tank 47. A spring 68 tends to thrust the piston 66 to its outermost position in the cylinder 67, thereby moving the pump cylinder block 57 to its maximum output position. A conduit 69 leading from the pressure in the system to the cylinder 67 furnishes liquid under pressure to the piston 66 and tends to move the same downward against the action of the spring 68, thereby reducing the volume output of the pump. It will be seen that with the use of this pump, illustrated in Fig. 5, the volume output of the variable delivery pump will be directly proportional to the pressure required at the cylinder motor and in case of an abnormal rise in pressure in the system, the volume output of the pump will be reduced to zero.

We claim the following:

1. In a hydraulic system of the type having a pressure source, a double acting hydraulic motor provided with two ports for pressure liquid, and a member to be reciprocated by said motor, a control panel comprising a housing provided with a longitudinal valve recess, pressure and tank lines connected to said recess, lines connecting said motor ports with said recess, a slidable valve stem in said valve recess, said valve stem being movable to connect said motor ports alternately with said pressure and tank lines, means on said reciprocating member for actuating said valve stem at various stages of the cycle of movement of said reciprocating member, and throttle valves in said panel each having a different setting, said throttle valves being arranged to be selectively connected in series in the exhaust flow from one of said motor ports to said tank line by the movement of said valve stem at various stages of the cycle of the reciprocating member to control the speed of the reciprocating member, while the other motor port is connected with the pressure port, the speed of the reciprocating member being directly dependent on the number of throttle valves in series in the exhaust flow.

2. In a hydraulic system of the type having a pressure source, a double acting hydraulic motor provided with two ports for pressure liquid, and a member to be reciprocated by said motor, a control panel comprising a housing provided with a longitudinal valve recess, pressure and tank lines connected to said recess, lines connecting said motor ports with said recess, a slidable valve stem in said valve recess, said valve stem being movable to connect said motor ports alternately with said pressure and tank lines, cam means on said reciprocating member for actuating said valve stem at various stages of the cycle of movement of said reciprocating member, and coarse and fine feed throttle valves in said panel, said throttle valves being arranged to be selectively connected in series in the exhaust flow from one of said motor ports to the tank line by the movement of said valve stem at various stages of the cycle of the reciprocating member to control the speed of the reciprocating member, while the other motor port is connected with the pressure port, the speed of the reciprocating member being directly dependent on the number of throttle valves in series in the exhaust flow.

3. In a hydraulic system, a pressure source, a double acting hydraulic motor provided with two ports for pressure liquid, a variable speed reciprocating member operated by said motor, a control panel comprising a housing provided with a longitudinal valve recess, pressure and tank lines connected to said recess, lines connecting said motor ports with said recess, a slidable valve stem in said valve recess, said valve stem being movable to connect said motor ports alternately with said pressure and tank lines, a hydrostatic flow control valve, a coarse feed throttle valve, and a fine feed throttle valve, said valve stem being so arranged that consecutive movements thereof will connect one of the motor ports with the pressure line, and will connect the exhaust flow from the other motor port to the tank line, respectively through the flow control valve and the coarse feed throttle valve in series with the exhaust flow and through the flow control valve and the coarse and fine feed throttle valves in series with the exhaust flow.

4. In a hydralic system having a pressure source, a double acting hydraulic motor provided with two ports for pressure liquid, and a variable speed reciprocating member connected for operation by said motor, means for controlling the rate and direction of movement of said member to effect starting, stopping, and a series of constant feed rates in the progression of the cycle of the reciprocating member comprising a housing provided with a longitudinal valve recess, a slidable valve stem in said valve recess, pressure and tank lines connected to said recess, lines connecting said motor ports with said recess, said valve stem being movable to connect said motor ports alternately with said pressure and tank lines, a hydrostatic flow control valve, a coarse feed throttle valve, and a fine feed throttle valve, and adjustable cam means on said reciprocating part for contacting and shifting said valve stem to its various positions at the various stages of the cycle, said valve stem being so arranged that consecutive movements thereof will connect one of the motor ports with the pressure line, and will connect the other motor port to the tank line, respectively through the flow control valve and the coarse feed throttle valve in series, and through the flow control valve and the coarse and fine feed throttle valves in series.

5. In a hydraulic system having a pressure source, a constant delivery pump, a double acting power cylinder provided with a port at each end to be used for pressure liquid, a differential area piston in said cylinder, a variable speed reciprocating member to be actuated by said power cylinder, means for controlling the rate and direction of movement of said member to effect starting, stopping, and a series of feed rates including rapid traverse, coarse feed, fine feed, and rapid reverse, said means comprising a housing provided with a longitudinal valve recess, a slidable valve stem in said valve recess, pressure and tank lines connected to said recess, lines connecting said motor ports with said recess, said valve stem being movable to connect said motor ports alternately with said pressure and tank lines, a hydrostatic flow control valve, a coarse feed throttle valve, and a fine feed throttle valve, said valve stem and lines connected thereto being so arranged that pressure may be directed to both cylinder ports to effect a differential rapid traverse action, and such that a shifting of said valve stem to various positions will connect one of the motor ports with the pressure port, and will connect the exhaust flow from the other motor port to the tank through the flow control valve and the coarse feed throttle valve in series to effect coarse feed and through the flow control valve and the coarse and fine feed throttle valves in series to effect fine feed, and will effect reversal by connecting the last named motor port to the pressure port and the other motor port to the tank.

6. In a hydraulic system, means for supplying liquid under pressure, a high pressure conducting line, an exhaust pressure conducting line for returning spent liquid to the source, a double acting hydraulic motor, a conduit connecting into the motor, a second conduit connecting into the motor, a member connected to the motor to be reciprocated thereby, a control unit into which the high and exhaust pressure lines connect and into which the conduits extending to the motor connect, a valve chamber in said unit, valve means in the control unit including a valve member in said chamber, means for shifting the valve member substantially at the ends of the reciprocable movement of said member to alternately connect the two conduits leading to the motor to the high and exhaust pressure lines, a plurality of restricted orifices in the control unit each having a different degree of restriction, passageways in the control unit interconnecting the orifices and the valve chamber, and means on the reciprocable member for shifting the valve member at various stages in the cycle of movement of the said reciprocable member for successively connecting the orifices in series in exhaust flow through the exhaust pressure line from one of the conduits leading to the motor while the other conduit leading to the motor is connected to the high pressure line, said orifices being arranged so that the resistance to exhaust flow increases depending on the number of orifices in series.

7. In a hydraulic system, a motor operable by the introduction of liquid under pressure, a line for conducting liquid under pressure to said motor, a line for conducting displaced liquid away from said motor, a member shifted by the motor, and means comprising a plurality of restricted orifices, each having a different degree of restriction, and valve means for controlling the direction of flow to and from the motor and for selectively connecting one or more of said orifices in series in one of said conducting lines to selectively increase the resistance of flow through said line depending on the number of orifices in series, and thereby decrease the rate of movement of the member, and a single hydrostatic flow control valve connected to regulate the rate of flow through said orifices under varying loads in accordance with the number of orifices connected in said line at any one time.

8. In a hydraulic system, a motor operable by the introduction of liquid under pressure, a line for conducting liquid under pressure to said motor, a line for conducting displaced liquid away from said motor, a member shifted by the motor, and means comprising a plurality of restricted orifices, each having a different degree of restriction, a hydrostatic flow control valve arranged to maintain a constant pressure drop across any member of said orifices, and valve means for controlling the direction of flow to and from the motor and for selectively connecting one or more of said orifices in series with said hydrostatic valve in one of said conducting lines to selectively increase the resistance of flow through said line depending on the number of orifices in series, and thereby decrease the rate of movement of the member.

9. A unitary control panel for controlling the movements of a hydraulically operated machine tool slide to give rapid advance, feed, and rapid return movements to a hydraulic motor supplied with pressure fluid from a single source of the type which delivers fluid at a predetermined maximum rate or at whatever lesser rate it may be consumed and which is controlled solely by the pressure head against which fluid is delivered, said panel comprising in combination a valve block having only four outside connection ports including pressure and exhaust ports and a pair of motor ports, means entirely self-contained within the block for limiting fluid flow to a predetermined adjustable feed rate, said means including an adjustable throttle and automatic means for maintaining constant the pressure drop through the throttle for all settings of the latter, shiftable valve means in the block for selectively establishing flow paths between said ports and the flow limiting means to provide a rapid advance by connecting the pressure port to a motor port, a feed by connecting the pressure port to the same motor port and the exhaust port to the other motor port with the flow limiting means in one of said connections, a rapid return and a stop, and a single control member shiftable between four positions for operating said valve means.

10. A unitary control panel for controlling the movements of a hydraulically operated machine tool slide to give rapid advance, feed, and rapid return movements to a hydraulic motor supplied with pressure fluid from a single source of the type which delivers fluid at a predetermined maximum rate or at whatever lesser rate it may be consumed and which is controlled solely by the pressure head against which fluid is delivered, said panel comprising in combination a valve block having only four outside connection ports including pressure and exhaust ports and a pair of motor ports, means entirely self-contained within the block for limiting fluid flow to a predetermined adjustable feed rate, said means including an adjustable throttle and automatic means for maintaining constant the pressure drop through the throttle for all settings of the letter, a single valve in said block and having valve ports communicating with said outside ports and with the flow limiting means, a unitary valve member shiftable between four positions for selectively establishing flow paths through said valve ports between said other ports and the flow limiting means to provide a rapid advance by connecting the pressure port to a motor port, a feed by connecting the pressure port to the same motor port and the exhaust port to the other motor port with the flow limiting means in one of said connections, a rapid return and a stop, and a control member shiftable between four positions for operating said valve member.

11. A unitary control panel for controlling the movements of a hydraulically operated machine tool slide to give rapid advance, feed and rapid return movements to a hydraulic motor supplied with pressure fluid from a single source of the type which delivers fluid at a predetermined maximum rate or at whatever lesser rate it may be consumed and which is controlled solely by the pressure head against which fluid is delivered, said motor being of the cylinder and piston type, said panel comprising in combination a valve block having only four outside connection ports including pressure and exhaust ports and a pair of motor ports, means in the block for limiting fluid flow to a predetermined adjustable feed rate, and a single valve in said block, said block having valve ports communicating with said other ports and with the flow limiting means, said valve ports including only one port connected through the block with one of the motor ports, said one port lying adjacent and between a valve port connected to the pressure port and a valve port having communication with the exhaust port, whereby a shiftable valve member having lands to connect said one port with the pressure port and block it from the exhaust port while connecting the other motor port with the pressure port, will provide differential rapid advance action, and a shiftable valve member of different form having lands to connect said one port with the exhaust port and block it from the pressure port while connecting the other motor port with the pressure port, will provide non-differential rapid advance action, said other valve ports cooperating with the valve members of either form to provide non-differential feed action, rapid return action and stop.

12. A unitary control panel for controlling the movements of a hydraulically operated machine tool slide to give rapid advance, feed, and rapid return movements to a hydraulic motor supplied with pressure fluid from a single source of the type which delivers fluid at a predetermined maximum rate or at whatever lesser rate it may be consumed and which is controlled solely by the pressure head against which fluid is delivered, said panel comprising in combination a valve block having only four outside connection ports including pressure and exhaust ports and a pair of motor ports, means in the block and governed solely by the fluid passing through the block for limiting fluid flow to a constant but adjustable feed rate under all variations of motor load, shiftable valve means in the block for selectively establishing flow paths between said ports and the flow limiting means to provide a rapid advance by connecting the pressure port to a motor port, a feed by connecting the pressure port to the same motor port and the exhaust port to the other motor port with the flow limiting means in one of said connections, a rapid return and a stop, and a single control member shiftable between four positions for operating said valve means.

KENNETH R. HERMAN.
FERRIS T. HARRINGTON.
L. RAYMOND TWYMAN.